United States Patent
Winfree et al.

(10) Patent No.: US 12,499,293 B2
(45) Date of Patent: Dec. 16, 2025

(54) METHOD AND SYSTEM FOR OPTIMIZING THE SHAPE OF AN OBJECT TO FACILITATE WRINKLE AND STRESS REDUCTION

(71) Applicant: The Boeing Company, Chicago, IL (US)

(72) Inventors: Troy Winfree, Seattle, WA (US); Eric S. Kamila, Edmonds, WA (US); William J. Moon, Bothell, WA (US); Jerry D. Chungbin, Kenmore, WA (US)

(73) Assignee: The Boeing Company, Arlington, VA (US)

( * ) Notice: Subject to any disclaimer, the term of this patent is extended or adjusted under 35 U.S.C. 154(b) by 1019 days.

(21) Appl. No.: 17/568,447

(22) Filed: Jan. 4, 2022

(65) Prior Publication Data
US 2022/0292233 A1    Sep. 15, 2022

Related U.S. Application Data

(60) Provisional application No. 63/161,205, filed on Mar. 15, 2021.

(51) Int. Cl.
G06F 30/20 (2020.01)
G06F 111/10 (2020.01)
G06F 119/18 (2020.01)

(52) U.S. Cl.
CPC .......... *G06F 30/20* (2020.01); *G06F 2111/10* (2020.01); *G06F 2119/18* (2020.01)

(58) Field of Classification Search
CPC ... G06F 30/20; G06F 2119/18; G06F 2111/10
See application file for complete search history.

(56) References Cited

U.S. PATENT DOCUMENTS

2019/0138675 A1*  5/2019  Fontes ................... G06F 30/23
2020/0151286 A1*  5/2020  Willis .................... G06T 17/20

OTHER PUBLICATIONS

Wu, Z. (2008). On the optimization problem of fillets and holes in plates with curvature constraints. Structural and Multidisciplinary Optimization, 35(5), 499-506. (Year: 2008).*

(Continued)

*Primary Examiner* — Bijan Mapar
(74) *Attorney, Agent, or Firm* — Harrity & Harrity, LLP (57) ABSTRACT

A method performed by a computing system that facilitates formation of an object comprises receiving manufacturing process data associated with an object to be formed via a drape-forming operation. The computing system receives a parametric model of the object. The parametric model facilitates specification of a radius of a fillet within a region associated with the object. The computing system determines, based on the parametric model of the object, a unit vector field associated with a surface of the object and the manufacturing process data. The computing system adjusts the radius of the fillet of the parametric model within the region to reduce an average divergence of the vector field to a minimum amount, and communicates output data associated with an adjusted parametric model to equipment configured to form a mandrel that facilitates formation of the object.

20 Claims, 9 Drawing Sheets

(56) References Cited

OTHER PUBLICATIONS

Tian, Y., Pu, S., Shi, T., & Xia, Q. (2021). A parametric divergence-free vector field method for the optimization of composite structures with curvilinear fibers. Computer Methods in Applied Mechanics and Engineering, 373, 113574. Available online Nov. 26, 2020. (Year: 2020).*

Lemaire, E., Zein, S., & Bruyneel, M. (2015). Optimization of composite structures with curved fiber trajectories. Composite Structures, 131, 895-904. (Year: 2015).*

* cited by examiner

METHOD AND SYSTEM FOR OPTIMIZING THE SHAPE OF AN OBJECT TO FACILITATE WRINKLE AND STRESS REDUCTION

RELATED APPLICATIONS

This application claims the benefit of priority under 35 U.S.C. § 119(e) of U.S. Provisional Application No. 63/161,205, filed Mar. 15, 2021, the content of which is incorporated herein by reference in its entirety.

BACKGROUND

Field

This application generally relates to manufacturing processes. In particular, this application describes a method and system for optimizing the shape of an object to remove material tension and compression during manufacture. This reduces associated defect outcomes including material wrinkling and bridging.

Description of Related Art

Drape forming is a manufacturing technique in which a sheet or sheets of material, such as plastic or resin-infused composite, is placed on a single positive mold or mandrel to form an object having the shape of the mandrel. In some applications, thermal processing softens the material. The material may conform to the shape under its own weight or pressure may be applied to facilitate conforming the material to the shape.

In some instances, the shape of the mandrel includes features that make it difficult for the material to uniformly conform to the shape of the mandrel. For example the mandrel may include regions of large double curvature, or regions with sharp corners. When draping the material over these regions, the material may wrinkle or become stressed. Wrinkles reduce the strength of the final product, and over stressed portions may tear during object formation or result in material thinning which also reduces final product strength.

SUMMARY

In a first aspect, a method performed by a computing system that facilitates formation of an object comprises receiving manufacturing process data associated with an object to be formed via a drape-forming operation. The computing system receives a parametric model of the object. The parametric model facilitates specification of a radius of a fillet within a region associated with the object. The computing system determines, based on the parametric model of the object, a unit vector field on the object. The computing system adjusts the radius of the fillet of the parametric model within the region to reduce an average divergence of the unit vector field to a minimum amount, and communicates output data associated with an adjusted parametric model to equipment configured to form a mandrel that facilitates formation of the object.

In a second aspect, a system comprises a memory that stores instruction code, and one or more processors in communication with the memory. The instruction code is executable by the one or more processors to perform operations comprising receiving manufacturing process data associated with an object to be formed via a drape-forming operation. The one or more processors receive a parametric model of the object. The parametric model facilitates specification of a radius of a fillet within a region associated with the object. The one or more processors determine, based on the parametric model of the object, a unit vector field associated with the object. The one or more processors adjust the radius of the fillet of the parametric model within the region to reduce an average divergence of the unit vector field to a minimum amount, and communicate output data associated with an adjusted parametric model to equipment configured to form a mandrel that facilitates formation of the object.

In a third aspect, a non-transitory computer-readable medium includes instruction code. The instruction code is executable by one or more processors for causing the one or more processors to perform operations comprising receiving manufacturing process data associated with an object to be formed via a drape-forming operation. The one or more processors receive a parametric model of the object. The parametric model facilitates specification of a radius of a fillet within a region associated with the object. The one or more processors determine, based on the parametric model of the object, a unit vector field associated with a surface of the object. The one or more processors adjust the radius of the fillet of the parametric model within the region to reduce an average divergence of the unit vector field to a minimum amount, and communicate output data associated with an adjusted parametric model to equipment configured to form a mandrel that facilitates formation of the object.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein, mean that the recited characteristic, parameter, or value need not be achieved exactly, but that deviations or variations, including, for example, tolerances, measurement error, measurement accuracy limitations and other factors known to one skilled in the art, may occur in amounts that do not preclude the effect the characteristic was intended to provide.

I. Introduction

As noted above, in drape manufacturing, the shape of an object can include features that make it difficult for the material to uniformly conform to the shape of the mandrel for forming the object. For example, a region or regions of the object may define large double curvatures, or sharp corners. When draping the material over these regions, the material can tend to wrinkle or become stressed, which can cause manufacturing or part strength issues.

Disclosed herein are examples of a shape optimization system (SOS) that optimizes the shape of the object to reduce or eliminate these issues. Generally, the SOS is configured to receive data that defines the shape of an object to be formed via a drape-forming operation. The SOS receives and operates on a parametric model of the object that facilitates specification of the radius of a fillet within, for example, a fillet surface (e.g., a circle-arc cross-section surface that joins two other surfaces with a continuous blend) of the object. The fillet may include abrupt changes in direction as it follows the adjacent shape of the object. The SOS adjusts the radius of the fillet in the parametric model within the fillet surface to reduce the average divergence of a unit vector field associated with the surface of the object and the forming process. After adjustment of the radius, the SOS communicates output data associated with the adjusted parametric model to equipment configured to form a mandrel that facilitates formation of the object.

Figure 1:
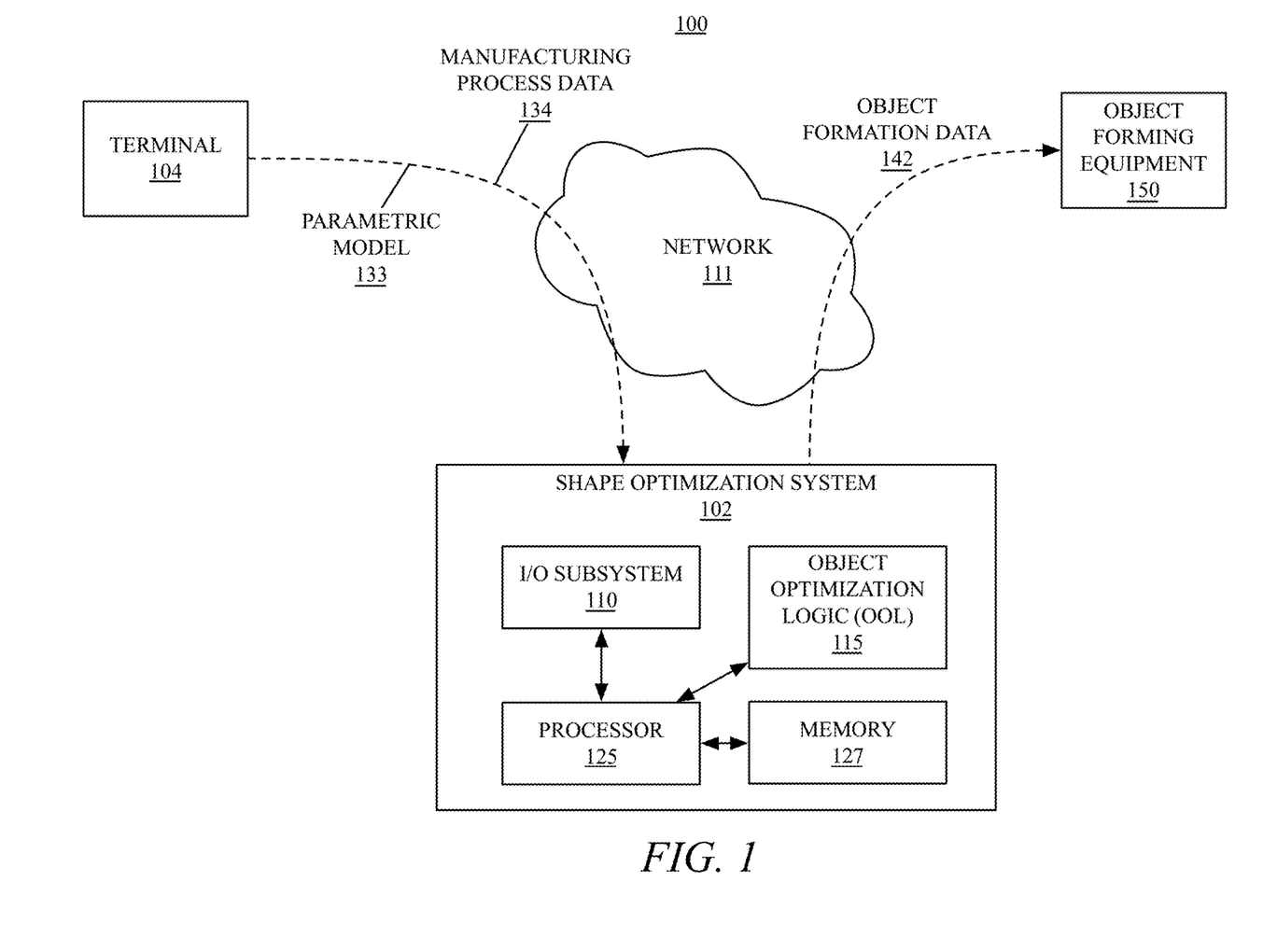
FIG. 1 illustrates an environment that includes various entities that cooperate to optimize the shape of an object to facilitate manufacturing the object, in accordance with an example.

FIG. 1 illustrates an example of an environment 100 that includes various entities that cooperate to optimize the shape of an object to facilitate manufacturing the object. Example entities of the environment 100 include a shape optimization system (SOS) 102, a terminal 104, and object forming equipment 150. Examples of the various entities of the environment 100 are configured to communicate with one another via a network 111, such as the Internet.

Referring to the figure, an example of the terminal 104 corresponds to a computer system such as a desktop computer, tablet, etc. The terminal 104 can correspond to a different type of computing device. An example of the terminal 104 corresponds to a computer-aided design (CAD) workstation that facilitates the design of various articles. In this regard, an example of the terminal 104 executes software such as AutoCad®, TurboCad®, Sketchup®, etc., that facilitates 2D and 3D design. An example of the terminal 104 includes a graphics accelerator, co-processor, and/or other hardware that facilitates the design of the article.

An example of the terminal 104 executes a browser or other interface that facilitates communicating a parametric model 133 associated with a design to the SOS 102. An example of the parametric model 133 specifies the shape of an object. In an example, the parametric model 133 and/or the shape of the object is generated by design software executing on the terminal 104. For instance, an example of the parametric model 133 and/or the shape of the object is specified via a computer aided design (CAD) program, such as AutoCad®, TurboCad®, Sketchup®, etc. Data that defines the parametric model 133 and/or the shape of the object may be specified in a file having a format such as a Drawing Exchange Format (DXF) or another file format.

An example of the parametric model 133 represents the design via constructive solid geometry (CSG). In CSG, the design is defined in terms of various primitive shapes, such as cylinders, cones, prisms, rectangles, sphere, etc. The parametric model 133 represents the design by combining one or more of these shapes according to various Boolean operations.

Another example of the parametric model 133 represents the design via boundary representation (BR). In BR, the design is defined in terms of the various surfaces that form the object's spatial boundaries (e.g., points, edges, etc.) The design is then represented by joining these spatial points.

An example of the object forming equipment 150 corresponds to a computer-numerical-control (CNC) milling machine. In this regard, an example of the object forming equipment 150 is configured to receive object forming data 142 that specifies an object to be formed. An example of the object forming data 142 is specified in a file having a format such as Drawing Exchange Format (DXF) or another file format that facilitates 3-dimensional representation of an object. In an example, the object forming equipment 150 is stationed at a remote location such as a factory.

In an example, the object forming equipment 150 is configured to form a mandrel. The mandrel is used in subsequent manufacturing operations, such as a drape forming process, to form an end-product or object having a shape that conforms and/or matches the shape of the mandrel.

The SOS 102 includes a memory 127, a processor 125, an input/output (I/O) subsystem 110, and object optimization logic (OOL) 115. Examples of the SOS 102 include other subsystems. As will be described in further detail below, the memory 127 stores instruction code that is executable by the processor 125 for causing the processor 125 to perform various operations.

As noted above, the processor 125 is in communication with the memory 127. The processor 125 is configured to execute instruction code stored in the memory 127. The instruction code facilitates performing, by the SOS 102, various operations that facilitate optimization of the design associated with the parametric model 133 communicated from the terminal 104. In this regard, the instruction code can cause the processor 125 to control and coordinate various activities performed by the different subsystems of the SOS 102. An example of the processor 125 corresponds to a stand-alone computer system such as an Intel®, AMD®, or ARM® based computer system or a different computer system and can include application-specific computer systems. An example of the computer system includes an operating system, such as Microsoft Windows®, Linux, Unix®, Mac OS®, or a different operating system.

An example of the I/O subsystem 110 includes one or more input, output, or input/output interfaces and is configured to facilitate communications with entities outside of the SOS 102, such as the terminal 104. In this regard, an example of the I/O subsystem 110 is configured to dynamically determine the communication methodology utilized by entities of the environment 100 and to communicate information to the entities with an interface that uses a determined communication methodology. For example, the I/O subsystem 110 can determine that a first entity utilizes a RESTful API and can, therefore, communicate with the entity using an interface that uses a RESTful communication methodology.

An example of the OOL 115 corresponds to hardware, software, or a combination thereof that is specifically configured to implement or assist in the implementation of various techniques or algorithms that facilitate optimization of the design of an object. For instance, an example of the OOL 115 implements a parametric modeler that facilitates adjusting parameters associated with a parametric model 133 that represents an object as a function of one or more variables or aspects associated with the object. An example of the OOL 115 implements algorithms for representing a vector field on an object and for determining the divergence of the vectors of the vector field. Examples of the OOL 115 can implement other logic or techniques.

Figure 2A:
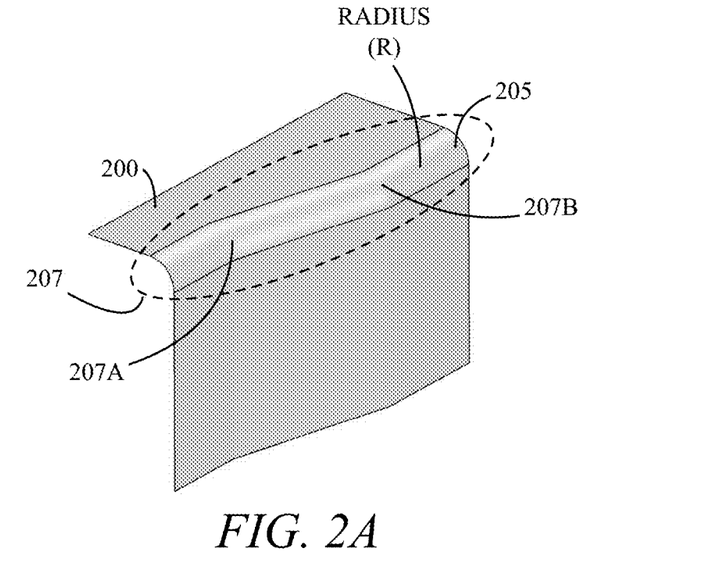
FIG. 2A illustrates an object having a shape that can be optimized by a shape optimization system (SOS) of the environment, in accordance with an example.
Figure 2B:
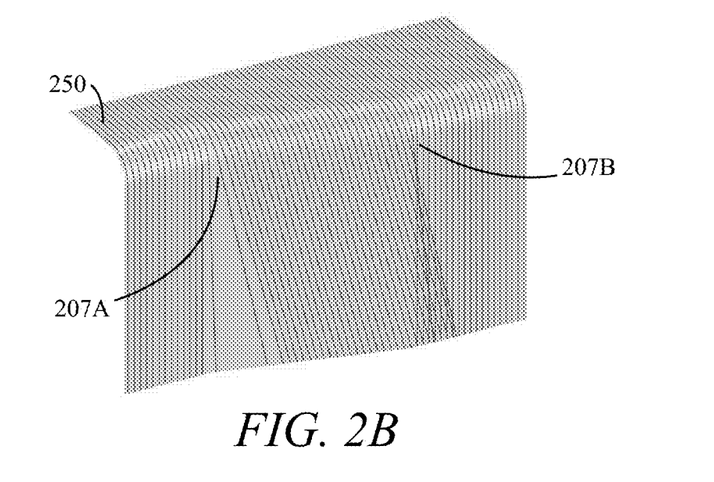
FIG. 2B illustrates geodesic curves aligned with drape directions on the object, in accordance with an example.

FIG. 2A illustrates an example of an object 200 defined by the parametric model 133. FIG. 2B illustrates geodesic curves 250 aligned with drape directions on the object 200. Referring to the figures, the object 200 has an L-shape cross-section and defines a region 207 (e.g., fillet surface) that further defines a fillet 205 having a radius, R. The object 200 defines a ramp start 207A and a ramp end 207B.

As noted above, forming an object 200 having such a shape can present problems. For example, the material from which the object 200 is formed may become stretched at the ramp start 207A and may become wrinkled at the ramp end 207B. For instance, as shown by the geodesic curves 250 of the object 200 illustrated in FIG. 2B, the paths along the surface begin to diverge at the ramp start 207A indicating a lack of material at the ramp start 207A. The lack of material can result in stretching below the ramp start 207A, which can lead to tearing or thinning of material in that region. The paths along the surface begin to converge at the ramp end 207B indicating an excess of material at the ramp end 207B. The excess of material can result in wrinkles forming below the ramp end 207B.

Figure 3:
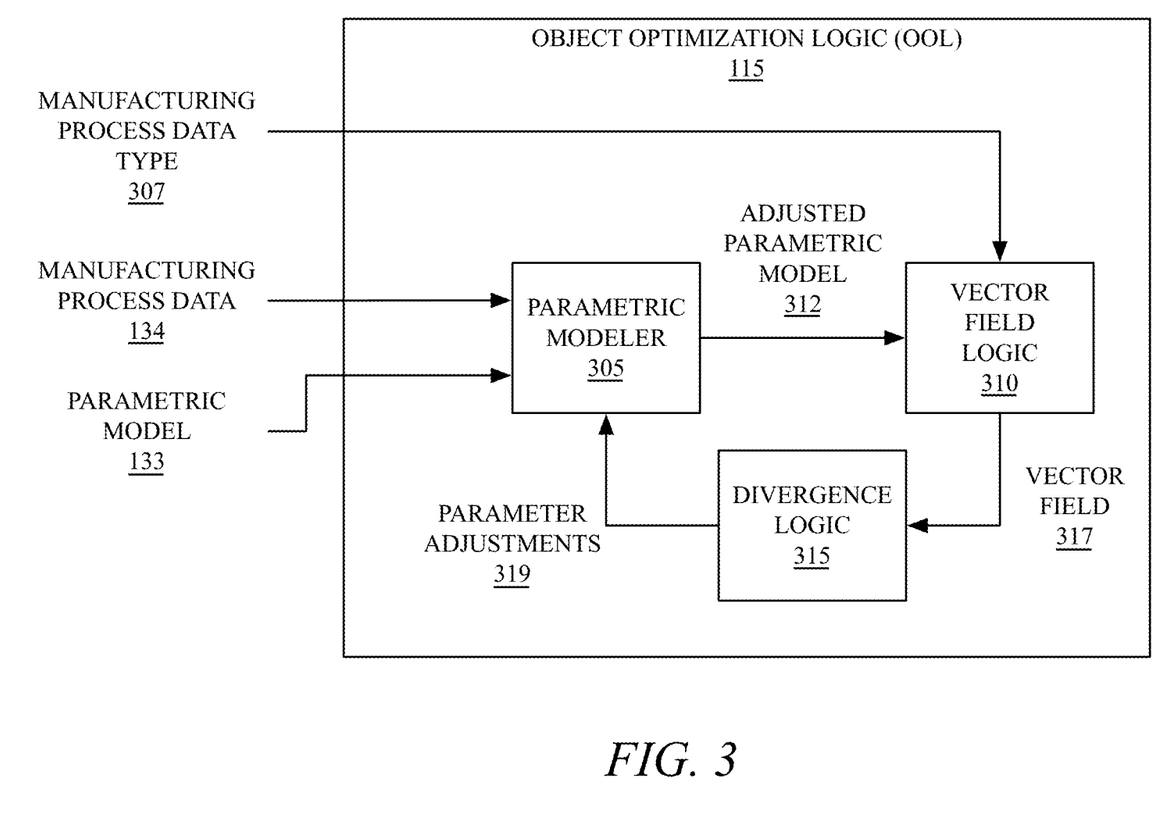
FIG. 3 is a logical representation of object optimization logic (OOL) of the SOS, in accordance with an example.

FIG. 3 is an example of a logical representation of the OOL 115. Referring to the figure, the OOL 115 includes a parametric modeler 305, vector field logic 310, and divergence logic 315. Operations performed by the OOL 115 are best understood with reference to the illustrations depicted in FIGS. 4A and 4B.

An example of the parametric modeler 305 is configured to receive a parametric model 133 that defines the shape of the object 200 to be formed and to generate an adjusted parametric model 312 of the object 200. An example of the parametric model 133 is specified in a file format such as a DXF file format or similar file format that facilitates specification of 3-dimensional objects and attributes associated with the object 200.

An example of the parametric modeler 305 is further configured to receive a parametric model 133 associated with the object 200. An example of the parametric model 133 represents the object 200 via constructive solid geometry (CSG). In CSG, the object 200 is defined in terms of various primitive shapes, such as cylinders, cones, prisms, rectangles, sphere, etc. The parametric model 133 represents the object 200 by combining one or more of these shapes according to various Boolean operations.

Another example of the parametric model 133 represents the object 200 via boundary representation (BR). In BR, the object 200 is defined in terms of the various surfaces that form the object's spatial boundaries (e.g., points, edges, etc.) The object 200 is then represented by joining these spatial points.

An example of the parametric modeler 305 facilitates the adjustment of one or more attributes associated with the parametric model 133. For instance, in an example, the parametric modeler 305 facilitates specification or adjustment of the radius of a fillet 205 of the object 200 within a particular region 207 of the object 200. In this regard, in an example, the radius of the fillet 205 is adjustable along the entire region 207, which facilitates forming a fillet having a non-uniform radius along the entire region 207. In another example, the parametric modeler 305 facilitates specification of other aspects such as the scale of the object 200 in the X, Y, and Z directions.

Figure 4A:
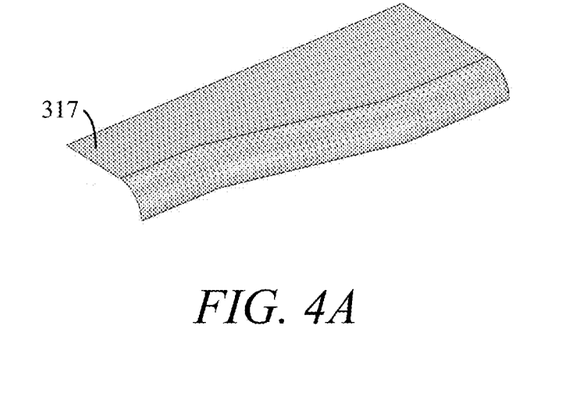
FIG. 4A illustrates a unit vector field generated by the OOL, in accordance with an example.

An example of the vector field logic 310 is configured to determine or generate a vector field 317 associated with the surface of the object 200 based on the adjusted parametric model 312 of the object 200. An example of the vector field 317 corresponds to a unit vector field where the magnitude of each vector in the field is one. An example of the unit vector field 317 associated with the object 200 of FIG. 2A is illustrated in FIG. 4A. In an example, determining the vector field 317 involves generating a drape-forming process model based on the shape of the object 200 and a type of manufacturing process data (i.e., manufacturing process data type 307) associated with the production of the object 200.

An example of the manufacturing process data type 307 specifies point, line, and/or region information, which further specifies one or more locations (e.g., points that define a contact region or contact line) of first contact associated with a drape-forming process. That is, these locations correspond to the region(s) where the material for forming the object 200 (e.g., flat sheet of material) first contacts the mandrel used for forming the object 200.

An example of a drape-forming process model, φ, used when the manufacturing process data type 307 specifies point, line and/or region information corresponds to a solution of an Eikonal model given by:

$|\nabla \varphi|=1;$ and $$\varphi|_I = 0$$

where I corresponds to an initial contact location.

In this instance, an example of a technique for determining the vector field 317 associated with the surface of the object 200 involves computing a gradient of the drape-forming process model.

Another example of the manufacturing process data type 307 specifies a drape direction, D. The drape direction specifies the direction a flat material (i.e., material for forming the object) moves as the flat material comes down onto the mandrel. An example of a drape-forming process model, φ, used when the manufacturing process data type 307 specifies the drape direction, is given by:

$$\phi = (S-p) \cdot D$$

where p corresponds to a point in a plane perpendicular to D above a surface, S, of the mandrel. In this example, it may not be necessary to identify an initial contact location because the initial contact location is defined implicitly by p and D as the region on the part where φ is minimal.

In this instance, an example of a technique for determining the vector field 317 associated with the surface of the object involves computing a gradient of the drape-forming process model and normalizing the computed gradient to produce a unit vector field 317 as expressed by:

$$R = \nabla f / |\nabla f|$$

where f corresponds to the drape-forming process model, φ.

The divergence logic 315 is configured to adjust parameters of the parametric model 133 to reduce the divergence of the vector field 317. An example of the divergence logic 315 adjusts the radius of the fillet 205 of the parametric model 133 within a particular region 207 associated with the object 200 to reduce the average divergence of the vector field 317 to a minimum amount.

Figure 4B:
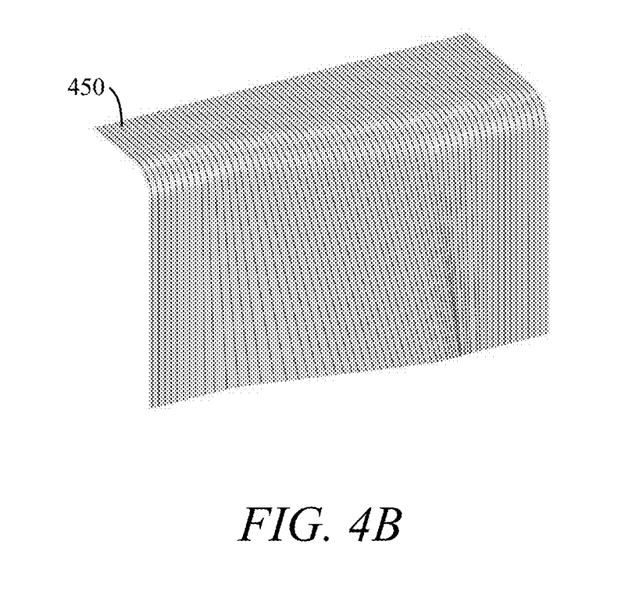
FIG. 4B illustrates geodesic curves aligned with drape directions on the object after shape optimization, in accordance with an example.

FIG. 4B illustrates an example of the geodesic curves 450 aligned with drape directions of the object 200 after adjustment of the parameters. As shown, the spacing between adjacent paths of the geodesic curves 450 of the object 200 is more uniform than the paths of the geodesic curves 250 of the object 200 illustrated in FIG. 2B. Thus, the excess material originally present at the ramp end 207B has been eliminated or substantially reduced, indicating less compression build-up in on the flange at the ramp end 207B. And the amount of spreading between the paths at the ramp start 207A has been eliminated or substantially reduced, indicating less tension build-up at the ramp start 207A.

In an example, the divergence logic 315 is configured to determine a value of an objective function associated with the divergence of the vector field 317, and to output parameter adjustments 319 to the parametric modeler 305. In an example, determination of the value of an objective function involves determining an average magnitude of the divergence over the surface, S, of the object 200 for a fillet 205 with radii schedule r according to:

$$F(r) = \frac{1}{A(S(r))} \int_{S(r)} |\nabla \cdot R(r)|$$

wherein R corresponds to the unit vector field determined above, and S corresponds to a parameterized surface representation. The radii schedule r corresponds to a vector of radii values for the fillet along the length of the fillet.

In an example, the parametric modeler 305 is configured to adjust the radius of the fillet of the parametric model 133 associated the object 200 based on the parameter adjustments 319 and through successive iterations to minimize the value output by the divergence logic 315.

Figure 5:
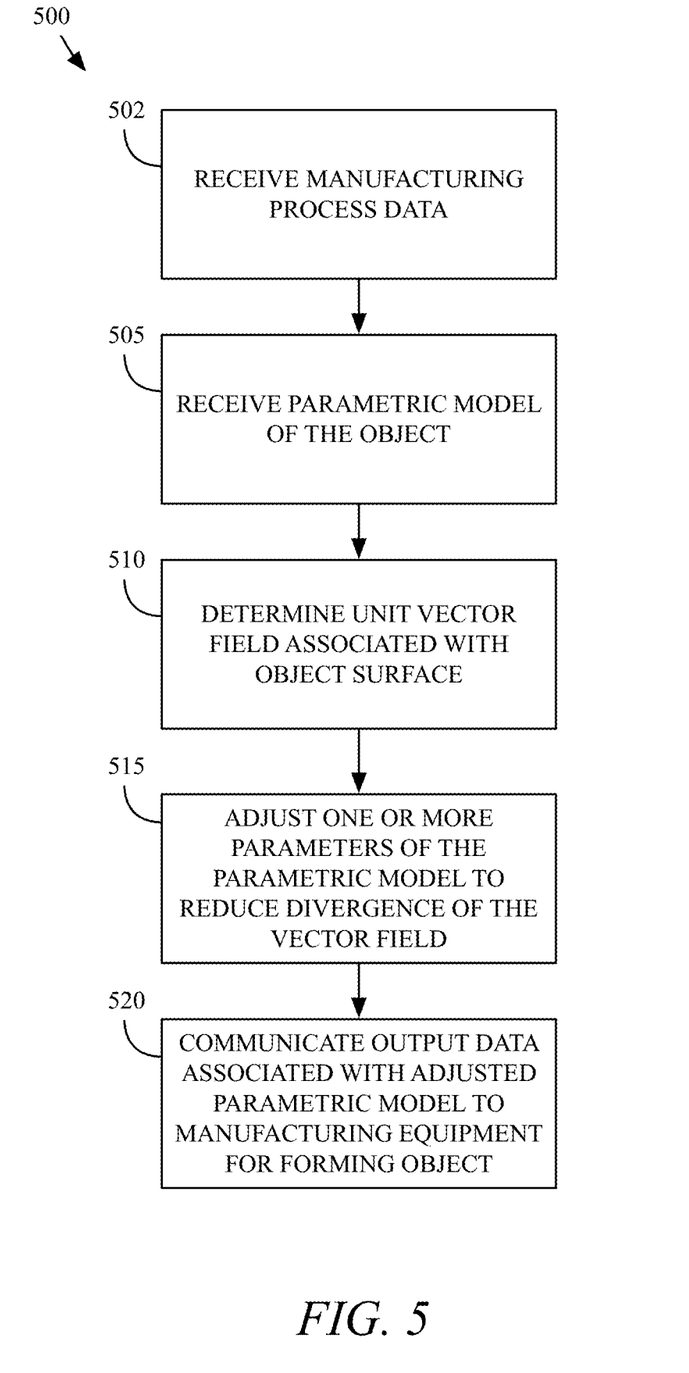
FIG. 5 illustrates operations performed by the SOS that facilitate optimizing the shape of an object, in accordance with an example.

FIG. 5 illustrates examples of operations 500 performed by an example of the SOS 102 that facilitate optimizing the shape of an object 200. It should be understood that one or more of the operations can be implemented in instruction code that can be stored in the memory of the respective systems. The instruction code can be executed by one or more processors of these systems, alone or in combination with other subsystems of these systems, to cause the respective systems to perform the operations illustrated in the figures.

At block 502, manufacturing process data is received. For instance, in an example, the parametric modeler 305 of the SOS 102 receives manufacturing process data 134. An example of the manufacturing process data 134 specifies point, line, and/or region information, which further specifies one or more locations (e.g., points that define a contact region or contact line) of first contact associated with a drape-forming process. Another example of the manufacturing process data 134 specifies a drape direction, D. The drape direction specifies the direction a flat material (i.e., material for forming the object) moves as the flat material comes down onto the mandrel.

At block 505, a parametric model associated with the object is received. For instance, in an example, the parametric modeler 305 of the SOS 102 receives the parametric model 133. As noted above, the parametric model 133 defines the shape of an object 200 to be formed. An example of the parametric model 133 is specified in a file format such as a DXF file format or similar file format that facilitates specification of 3-dimensional objects and attributes associated with the object 200. An example of the parametric model 133 represents the object 200 via constructive solid geometry (CSG). Another example of the parametric model 133 represents the object 200 via boundary representation (BR).

At block 510, a vector field 317 associated with the object surface is determined. For instance, an example of the vector field logic 310 of the SOS 102 determines or generates a vector field 317 associated with the surface of the object based on the parametric model 133 of the object 200. As noted above, an example of the vector field 317 corresponds to a unit vector field where the magnitude of each vector in the field is one. In an example, determining the vector field 317 involves generating a drape-forming process model based on the shape of the object 200 and a manufacturing process data type 307 associated with the production of the object 200. As noted above a first manufacturing process data type 307 specifies point, line, and/or region information. A second manufacturing process data type 307 specifies a drape direction, D.

An example of the drape-forming process model corresponds to a solution of an Eikonal model, as described above. In another example, the drape-forming process model is expressed as:

$$\phi = (S-p) \cdot D$$

where p corresponds to a point in a plane perpendicular to D above a surface, S, of the mandrel. In an example, determining the vector field 317 further involves computing the gradient of the drape-forming process model and normalizing the computed gradient to produce a unit vector field 317.

At block 515, one or more parameters of the parametric model 133 are adjusted to reduce the divergence of the vector field 317. For example, as noted above, an example of the parametric modeler 305 facilitates adjustment of one or more attributes associated with the parametric model 133, such as the scale of the object 200 in the X, Y, and Z directions. In an example, the parametric modeler 305 facilitates specification or adjustment of the radius of the fillet 205 of the object 200 within a particular region 207 of the object 200. In some examples, the adjusted radius of the fillet is maintained within a predetermined upper limit and a predetermined lower limit. For instance, in an example, the predetermined upper limit and the predetermined lower limit are specified by a designer. In an example, the predetermined upper limit and the predetermined lower limit are specified in the parametric model 133 communicated to the SOS 102.

The parametric modeler 305 adjusts parameters of the parametric model 133 to reduce the divergence of the vector field 317. An example of the parametric modeler 305 adjusts the radius of the fillet 205 of the parametric model 133 within a particular region 207 associated with the object 200 to reduce the average divergence of the vector field 317 to a minimum amount.

In an example, the divergence logic 315 is configured to determine a value of an objective function associated with the divergence of the vector field 317. In an example, the value of the objective function involves determining an average magnitude of the divergence over the surface, S, of the object 200 for a fillet 205 with radius schedule r according to:

$$F(r) = \frac{1}{A(S(r))} \int_{S(r)} |\nabla \cdot R(r)|$$

wherein R corresponds to the unit vector field determined above, and S corresponds to a parameterized surface representation.

The parametric modeler 305 is configured to adjust the radius of the fillet of the parametric model 133 associated the object 200 through successive iterations to minimize the value output by the divergence logic 315.

At block 520, output data associated with the adjusted parametric model is communicated to manufacturing equipment for forming the object. For instance, an example of the SOS 102 communicates a file that specifies object formation data 142 associated with the adjusted parametric model 312 to object forming equipment 150, such as a CNC milling machine. An example of the object forming data 142 is specified in a file having a format such as a Drawing Exchange Format (DXF) or another file format that facilitates 3-dimensional representation of an object 200. An example of the object to be formed by the object forming equipment 150 corresponds to a mandrel that can be used in subsequent manufacturing operations to form a complementary object 200 via, for example, a drape forming process.

Figure 6A:
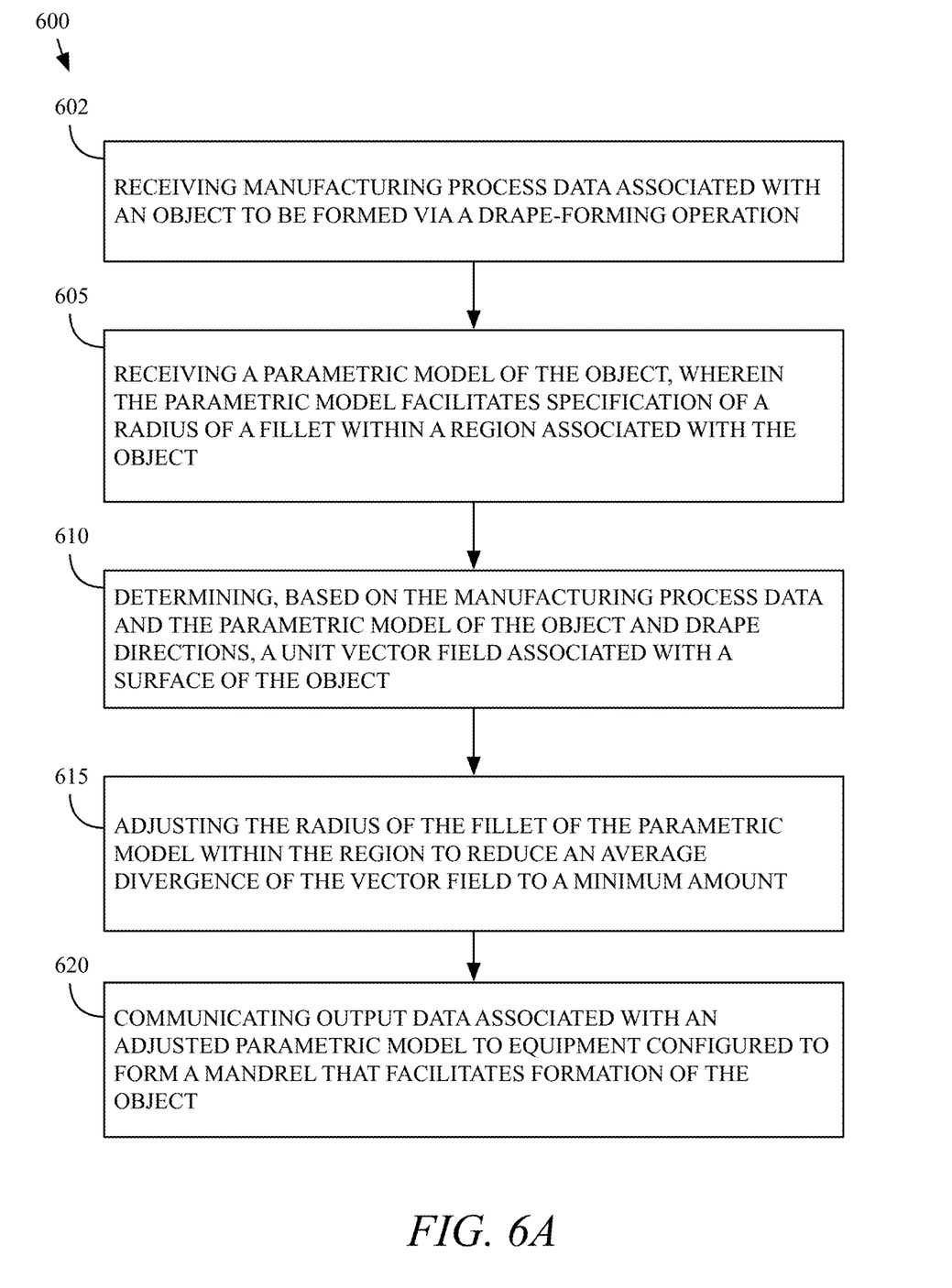
FIG. 6A illustrates a computer-implemented method performed by a computing system such as the SOS, in accordance with an example.
Figure 6B:
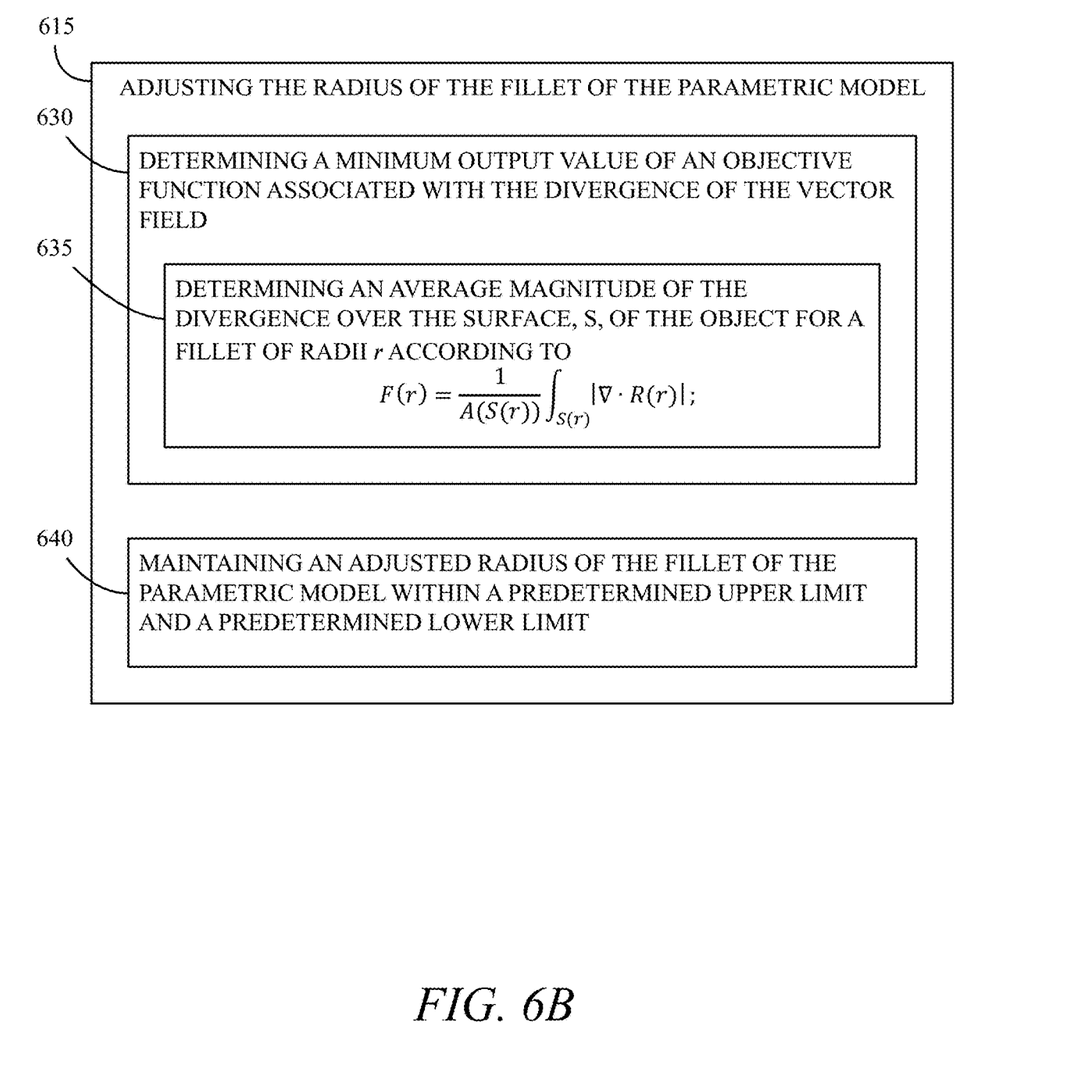
FIG. 6B illustrates further aspects of the computer-implemented method, in accordance with an example.
Figure 6C:
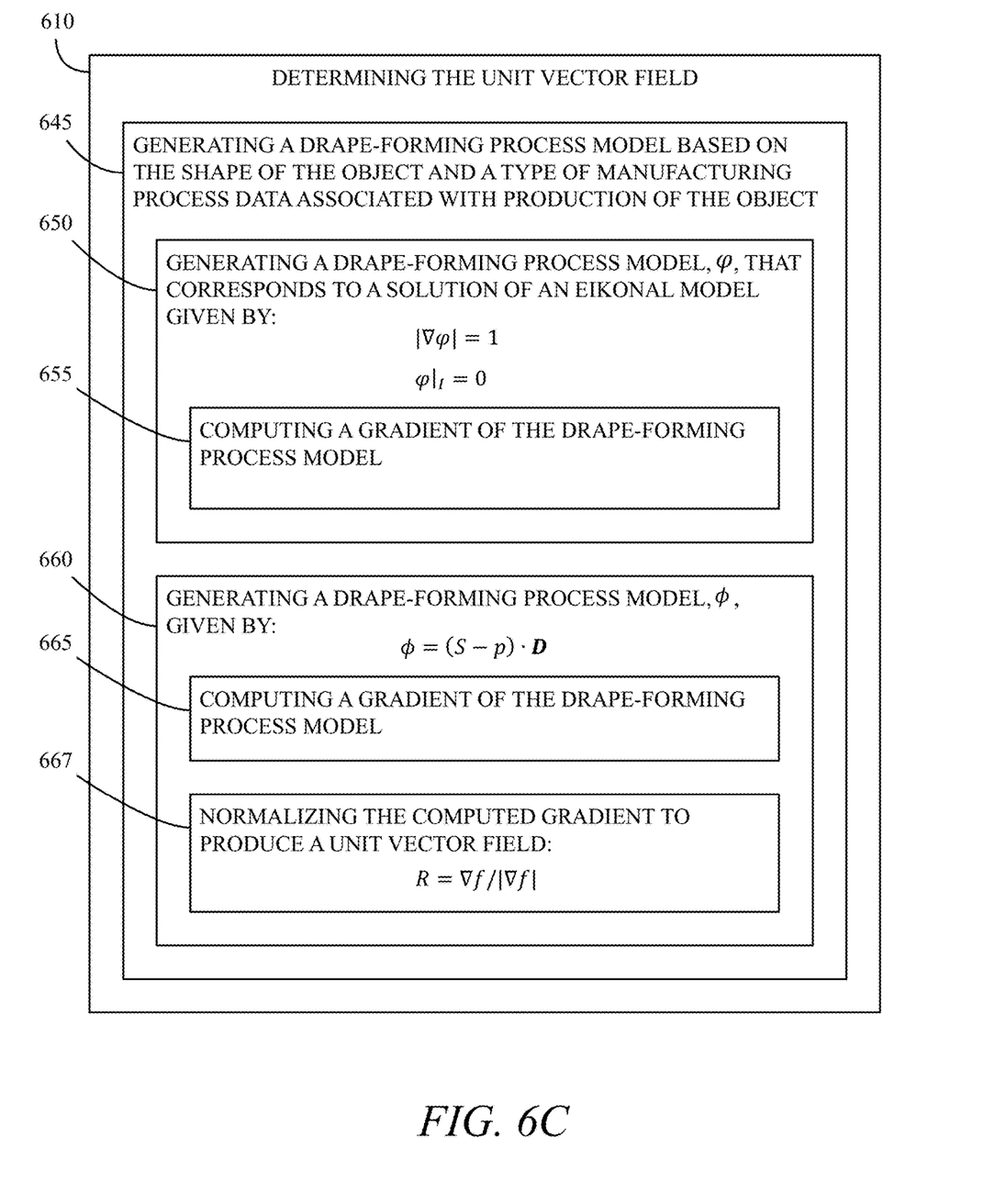
FIG. 6C illustrates yet further aspects of the computer-implemented method, in accordance with an example.

FIGS. 6A-6C illustrate example operations 600 of a computer-implemented method performed by a computing system such as one or more examples of the SOS 102 described above. Block 602 involves receiving, by the computing system, manufacturing process data associated with an object to be formed via a drape-forming operation.

Block 605 involves receiving, by the computing system, a parametric model of the object. The parametric model facilitates specification of a radius of a fillet within a region associated with the object.

Block 610 involves determining, by the computing system and based on the parametric model of the object, a unit vector field associated with a surface of the object.

Block 615 involves adjusting, by the computing system, the radius of the fillet of the parametric model within the region to reduce an average divergence of the vector field to a minimum amount.

Block 620 involves communicating, by the computing system, output data associated with an adjusted parametric model to equipment configured to form a mandrel that facilitates formation of the object.

As shown in block 615, in some examples, adjusting the radius of the fillet of the parametric model within the region to reduce the average divergence of the vector field to the minimum amount involves determining 630 a minimum output value of an objective function associated with the divergence of the vector field.

As shown in block 635, in some examples, determining the minimum output value of the objective function involves determining an average magnitude of the divergence over the surface, S, of the object for a fillet of radii r according to:

$$F(r) = \frac{1}{A(S(r))} \int_{S(r)} |\nabla \cdot R(r)|;$$

and
minimizing F(r), wherein R corresponds to the unit vector field, and S corresponds to a parameterized surface representation.

In some examples, adjusting 615 the radius of the fillet of the parametric model within the region of the object to reduce the average divergence of the vector field to the minimum amount involves maintaining 640 an adjusted radius of the fillet of the parametric model within a predetermined upper limit and a predetermined lower limit.

In some examples, determining 610 the unit vector field associated with the surface of the object further involves generating 645 a drape-forming process model based on the shape of the object and a type of manufacturing process data associated with production of the object.

In some examples, when the type of manufacturing process data specifies one or more of point, line or region information that specifies one or more locations of first contact associated with a drape-forming process, generating 645 the drape-forming process model further involves generating 650 a drape-forming process model, φ, that corresponds to a solution of an Eikonal model given by:

$$|\nabla \varphi| = 1; \text{ and}$$

$$\varphi|_I = 0$$

where I corresponds to an initial contact location.

In some examples, generating 650 a drape-forming process model, φ, that corresponds to a solution of an Eikonal model involves computing 655 a gradient of the drape-forming process model.

In some examples, when the type of manufacturing process data specifies a drape direction, D, that specifies a direction a flat material moves as the flat material comes down onto the mandrel, generating 645 the drape-forming process model further involves generating 660 a drape-forming process model, φ, given by:

$$\varphi = (S-p) \cdot D$$

where p corresponds to a point in a plane perpendicular to D above a surface, S, of the mandrel. In this example, it may not be necessary to identify an initial contact location because the initial contact location is defined implicitly by p and D as the region on the part where ϕ is minimal.

In some examples, generating 660 the drape-forming process model, ϕ, involves computing 665 a gradient of the drape-forming process model and, normalizing 667 the computed gradient to produce a unit vector field:

$$R = \nabla f / |\nabla f|$$

wherein f corresponds to the drape-forming process model, ϕ.

Figure 7:
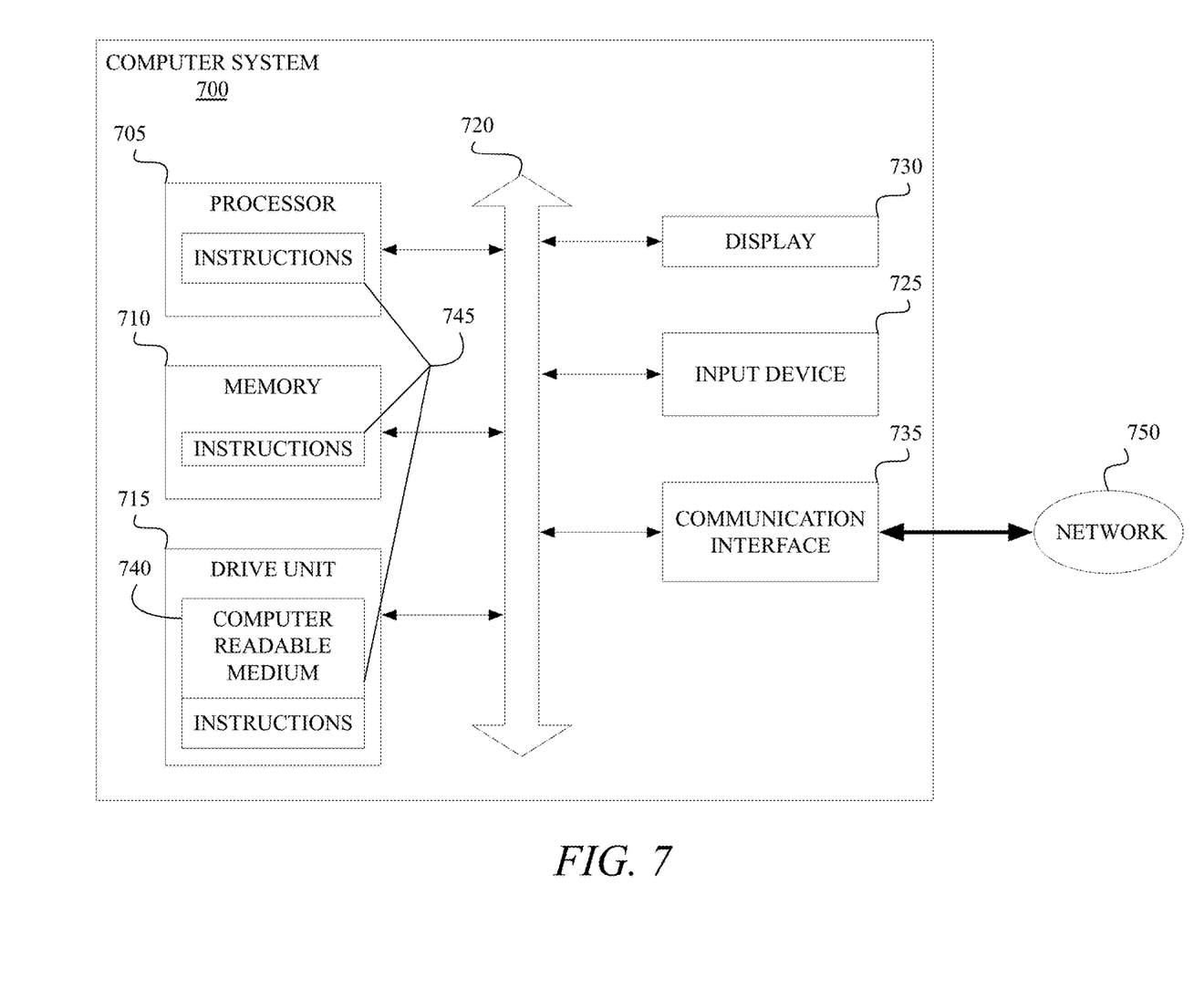
FIG. 7 illustrates a computer system that can form part of or implement any of the systems or devices of the environment, in accordance with an example.

FIG. 7 illustrates an example of a computer system 700 that can form part of or implement any of the systems and/or devices described above. The computer system 700 can include a set of instructions 745 that the processor 705 can execute to cause the computer system 700 to perform any of the operations described above. An example of the computer system 700 can operate as a stand-alone device or can be connected, e.g., using a network, to other computer systems or peripheral devices.

In a networked example, the computer system 700 can operate in the capacity of a server or as a client computer in a server-client network environment, or as a peer computer system in a peer-to-peer (or distributed) environment. The computer system 700 can also be implemented as or incorporated into various devices, such as a personal computer or a mobile device, capable of executing instructions 745 (sequential or otherwise), causing a device to perform one or more actions. Further, each of the systems described can include a collection of subsystems that individually or jointly execute a set, or multiple sets, of instructions to perform one or more computer operations.

The computer system 700 can include one or more memory devices 710 communicatively coupled to a bus 720 for communicating information. In addition, code operable to cause the computer system to perform operations described above can be stored in the memory 710. The memory 710 can be random-access memory, read-only memory, programmable memory, hard disk drive, or any other type of memory or storage device.

The computer system 700 can include a display 730, such as a liquid crystal display (LCD), a cathode ray tube (CRT), or any other display suitable for conveying information. The display 730 can act as an interface for the user to see processing results produced by processor 705.

Additionally, the computer system 700 can include an input device 725, such as a keyboard or mouse or touch-screen, configured to allow a user to interact with components of system 700.

The computer system 700 can also include a disk or optical drive unit 715. The drive unit 715 can include a computer-readable medium 740 in which the instructions 745 can be stored. The instructions 745 can reside completely, or at least partially, within the memory 710 and/or within the processor 705 during execution by the computer system 700. The memory 710 and the processor 705 also can include computer-readable media as discussed above.

The computer system 700 can include a communication interface 735 to support communications via a network 750. The network 750 can include wired networks, wireless networks, or combinations thereof. The communication interface 735 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program, as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. A method implemented by a system that facilitates formation of an object, the method comprising:
   receiving, by a computing system, manufacturing process data associated with an object to be formed via a drape-forming operation;
   receiving, by the computing system, a parametric model of the object, wherein the parametric model facilitates specification of a radius of a fillet within a region associated with the object;
   determining, by the computing system and based on the manufacturing process data and the parametric model of the object, a unit vector field associated with a surface of the object;
   adjusting, by the computing system, the radius of the fillet within the region to reduce an average divergence of the unit vector field to a minimum amount;
   communicating, by the computing system, output data associated with an adjusted parametric model to equipment; and
   forming, by the equipment and based on the output data, a mandrel that facilitates formation of the object.

2. The method according to claim 1, wherein adjusting the radius comprises:
   determining a minimum output value of an objective function associated with the average divergence of the unit vector field.

3. The method according to claim 2, wherein determining the minimum output value of the objective function comprises:
   determining an average magnitude of the average divergence of the unit vector field over the surface, S, of the object for a fillet of radii r according to:

$$F(r) = \frac{1}{A(S(r))} \int_{S(r)} |\nabla \cdot R(r)|;$$

and minimizing F(r), wherein R corresponds to the unit vector field, and S corresponds to a parameterized surface representation.

4. The method according to claim 1, wherein determining the unit vector field associated with the surface of the object further comprises:
generating a drape-forming process model based on a shape of the object and a type of manufacturing process data associated with production of the object.

5. The method according to claim 4, wherein, when the type of manufacturing process data specifies one or more of point, line, or region information that specifies one or more locations of first contact associated with a drape-forming process, generating the drape-forming process model further comprises:
generating a drape-forming process model, φ, that corresponds to a solution of an Eikonal model given by:

$|\nabla \varphi| = 1$; and $\varphi|_I = 0,$ wherein I corresponds to an initial contact location.

6. The method according to claim 5, wherein determining the unit vector field associated with the surface of the object comprises:
computing a gradient of the drape-forming process model.

7. The method according to claim 4, wherein, when the type of manufacturing process data specifies a drape direction, D, that specifies a direction a flat material moves as the flat material comes down onto the mandrel, generating the drape-forming process model further comprises:
generating a drape-forming process model, φ, given by:

$\varphi = (S-p) \cdot D,$ wherein p corresponds to a point in a plane perpendicular to D above a surface, S, of the mandrel.

8. The method according to claim 7, wherein determining the unit vector field associated with the surface of the object comprises:
computing a gradient of the drape-forming process model; and
normalizing the computed gradient to produce a unit vector field:
wherein f corresponds to the drape-forming process model, φ.

9. The method according to claim 1, wherein adjusting the radius comprises:
maintaining an adjusted radius of the fillet within a predetermined upper limit and a predetermined lower limit.

10. A system comprising:
a computing system comprising:
a memory that stores instruction code; and
a processor in communication with the memory, wherein the instruction code is executable by the processor to cause the computing system to perform operations comprising:
receiving manufacturing process data associated with an object to be formed via a drape-forming operation;
receiving a parametric model of the object, wherein the parametric model facilitates specification of a radius of a fillet within a region associated with the object;
determining, based on the manufacturing process data and the parametric model of the object, a unit vector field associated with a surface of the object;
adjusting the radius of the fillet within the region to reduce an average divergence of the unit vector field to a minimum amount; and
communicating output data associated with an adjusted parametric model to equipment; and
the equipment configured to form, based on the output data, a mandrel that facilitates formation of the object.

11. The system according to claim 10, wherein, in adjusting the radius, the instruction code causes the computing system to perform operations comprising:
determining a minimum output value of an objective function associated with the average divergence of the unit vector field.

12. The computing system according to claim 11, wherein, in determining the minimum output value of the objective function, the instruction code causes the computing system to perform operations comprising:
determining an average magnitude of the average divergence of the unit vector field over the surface, S, of the object for a fillet of radii r according to:

$$F(r) = \frac{1}{A(S(r))} \int_{S(r)} |\nabla \cdot R(r)|;$$

and minimizing F(r), wherein R corresponds to the unit vector field, and S corresponds to a parameterized surface representation.

13. The computing system according to claim 10, wherein, in determining the unit vector field associated with the surface of the object, the instruction code causes the computing system to perform operations comprising:
generating a drape-forming process model based on a shape of the object and a type of manufacturing process data associated with production of the object.

14. The computing system according to claim 13, wherein, when the type of manufacturing process data specifies one or more of point, line, or region information that specifies one or more locations of first contact associated with a drape-forming process, in generating the drape-forming process model, the instruction code causes the computing system to perform operations comprising:
generating a drape-forming process model, φ, that corresponds to a solution of an Eikonal model given by:

$|\nabla \varphi| = 1$; and $\varphi|_I = 0,$ wherein I corresponds to an initial contact location.

15. The computing system according to claim 14, wherein, in determining the unit vector field associated with the surface of the object, the instruction code causes the computing system to perform operations comprising:
computing a gradient of the drape-forming process model.

16. The computing system according to claim 13, wherein, when the type of manufacturing process data specifies a drape direction, D, that specifies a direction a flat material moves as the flat material comes down onto the mandrel, in generating the drape-forming process model, the instruction code causes the computing system to perform operations comprising:

generating a drape-forming process model, φ, given by:

$$\phi = (S-p) \cdot D,$$

wherein p corresponds to a point in a plane perpendicular to D above a surface, S, of the mandrel.

17. The computing system according to claim 16, wherein, in determining the unit vector field associated with the surface of the object, the instruction code causes the computing system to perform operations comprising:

computing a gradient of the drape-forming process model; and normalizing the computed gradient to produce a unit vector field:

$$R = \frac{\nabla f}{|\nabla f|},$$

wherein f corresponds to the drape-forming process model, φ.

18. The computing system according to claim 10, wherein, in adjusting the radius, the instruction code causes the computing system to perform operations comprising:

maintaining an adjusted radius of the fillet within a predetermined upper limit and a predetermined lower limit.

19. A non-transitory computer-readable medium having stored thereon instruction code, wherein the instruction code is executable by a processor of a system to cause the system to perform operations comprising:

receiving, by a computing system, manufacturing process data associated with an object to be formed via a drape-forming operation;

receiving, by the computing system, a parametric model of the object, wherein the parametric model facilitates specification of a radius of a fillet within a region associated with the object;

determining, by the computing system and based on the parametric model of the object, a unit vector field associated with a surface of the object;

adjusting, by the computing system, the radius of the fillet within the region to reduce an average divergence of the unit vector field to a minimum amount;

communicating, by the computing system, output data associated with an adjusted parametric model to equipment; and forming, by the equipment and based on the output data, a mandrel that facilitates formation of the object.

20. The non-transitory computer-readable medium according to claim 19, wherein in adjusting the radius, the instruction code is executable to cause the system to perform operations comprising:

determining a minimum output value of an objective function associated with the average divergence of the unit vector field.

* * * * *